(12) United States Patent
Priest et al.

(10) Patent No.: US 11,191,262 B2
(45) Date of Patent: Dec. 7, 2021

(54) WATERFOWL DECOY

(71) Applicant: CLINTON DECOY CO., LTD., Clinton, IA (US)

(72) Inventors: John Brian Priest, Dubuque, IA (US); Joe G. Box, North Benton, OH (US)

(73) Assignee: Clinton Decoy Co., LTD., Clinton, IA (US)

( * ) Notice: Subject to any disclaimer, the term of this patent is extended or adjusted under 35 U.S.C. 154(b) by 263 days.

(21) Appl. No.: 16/517,470

(22) Filed: Jul. 19, 2019

(65) Prior Publication Data

US 2020/0022360 A1 Jan. 23, 2020

Related U.S. Application Data

(60) Provisional application No. 62/700,654, filed on Jul. 19, 2018.

(51) Int. Cl.
*A01M 31/06* (2006.01)

(52) U.S. Cl.
CPC .................. *A01M 31/06* (2013.01)

(58) Field of Classification Search
CPC ..................................... A01M 31/06
USPC ........................................... 43/2, 3
See application file for complete search history.

(56) References Cited

U.S. PATENT DOCUMENTS

| | | | | |
|---|---|---|---|---|
| 1,392,065 A * | 9/1921 | Klock | ............... | A01M 31/06 43/3 |
| 2,342,107 A * | 2/1944 | Agius | ............... | A01M 31/06 43/3 |
| 2,691,233 A * | 10/1954 | Richardson | ............ | A01M 31/06 43/3 |
| 4,128,958 A * | 12/1978 | Snow | ................ | A01M 31/06 43/3 |
| 4,322,908 A * | 4/1982 | McCrory | ............ | A01M 31/06 43/3 |
| 4,422,257 A * | 12/1983 | McCrory | ............ | A01M 31/06 43/3 |
| 4,566,214 A * | 1/1986 | McCrory | ............ | A01M 31/06 43/3 |
| 5,775,022 A * | 7/1998 | Sumrall | .............. | A01M 31/06 43/3 |
| 5,930,936 A * | 8/1999 | Parr | .................... | A01M 31/06 43/3 |
| 6,070,356 A * | 6/2000 | Brint | ................... | A01M 31/06 43/2 |
| 6,412,209 B1 * | 7/2002 | Kapraly | .............. | A01M 31/06 43/3 |
| 6,553,709 B1 * | 4/2003 | Owen | ................. | A01M 31/06 43/3 |
| 7,322,144 B2 * | 1/2008 | Brewer | ................ | A01M 31/06 43/3 |
| 9,609,860 B1 * | 4/2017 | Slaughter | ............ | G08C 19/00 |
| 9,681,657 B2 * | 6/2017 | Kubinec | .............. | A01M 31/06 |
| 10,194,654 B2 * | 2/2019 | Hanson | ................ | A01M 31/06 |
| 10,609,920 B2 * | 4/2020 | Smith | ................ | B65H 75/4471 |
| 2004/0010957 A1 * | 1/2004 | Corbiere, Jr. | ......... | A01M 31/06 43/3 |
| 2015/0059229 A1 * | 3/2015 | Miller | .................. | A01M 31/06 43/3 |

(Continued)

*Primary Examiner* — Christopher P Ellis
(74) *Attorney, Agent, or Firm* — Rathe Lindenbaum LLP

(57) ABSTRACT

A waterfowl decoy may include a decoy body for flotation, a submersible keel projecting from the body and a keel rocker to rock the keel to form ripples in water about the body.

19 Claims, 7 Drawing Sheets

(56) References Cited

U.S. PATENT DOCUMENTS

| | | | |
|---|---|---|---|
| 2016/0128319 A1* | 5/2016 | Smart | A01M 31/06 43/2 |
| 2016/0205921 A1* | 7/2016 | Janzen, Jr. | A01M 31/06 |
| 2016/0309704 A1* | 10/2016 | Young | A01M 31/06 |
| 2016/0324142 A1* | 11/2016 | Stirling | A01M 31/06 |
| 2019/0364880 A1* | 12/2019 | Norton | A01M 31/06 |
| 2020/0146279 A1* | 5/2020 | Young | A01M 31/06 |
| 2020/0323196 A1* | 10/2020 | Clark | B65H 75/4431 |
| 2020/0352153 A1* | 11/2020 | Newman, Jr. | A01M 31/06 |
| 2021/0141379 A1* | 5/2021 | DeLoach, III | G08C 19/28 |

\* cited by examiner

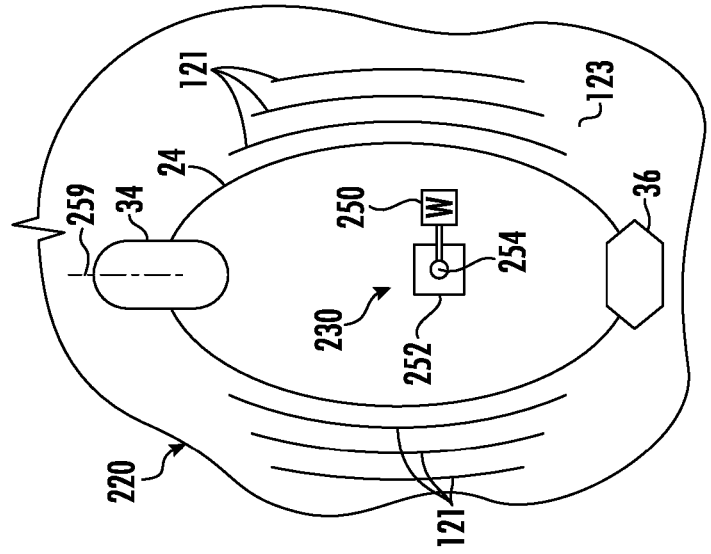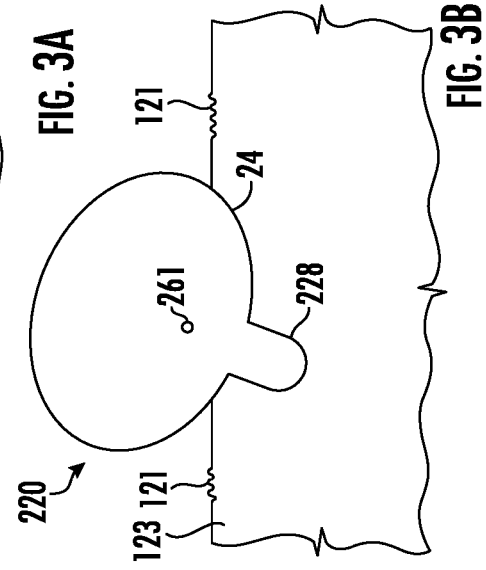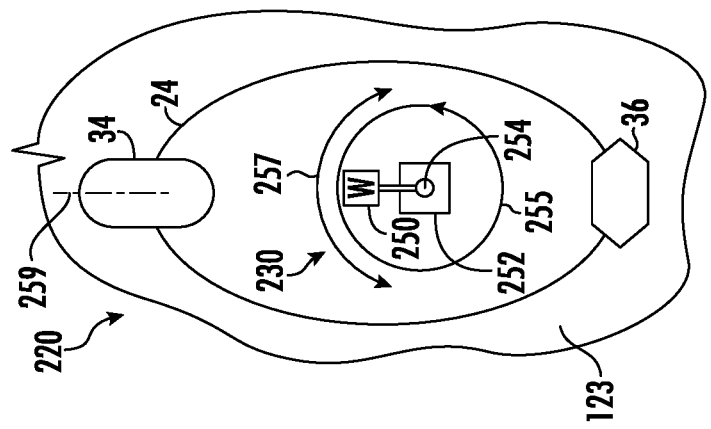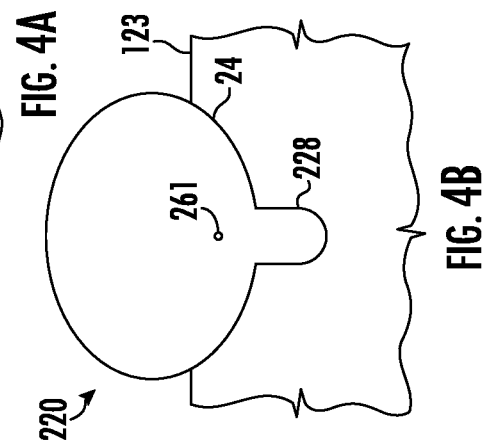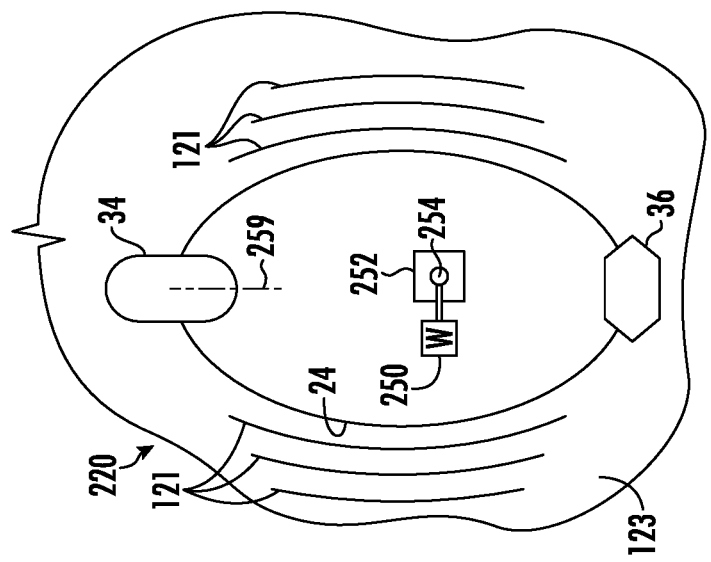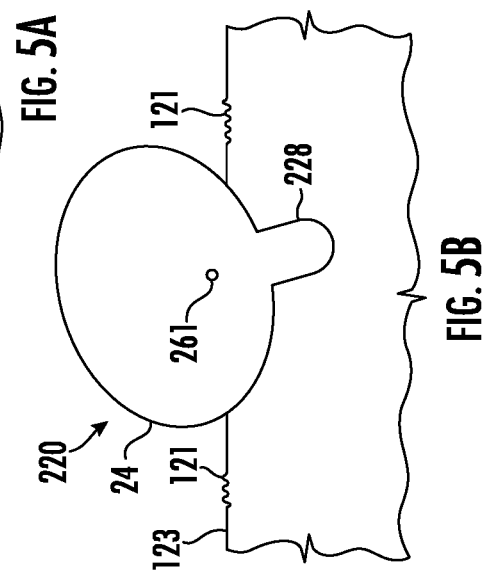

WATERFOWL DECOY

CROSS-REFERENCE TO RELATED PATENT APPLICATIONS

The present application is a US non-provisional patent application claiming priority under 35 USC 119 from co-pending U.S. Provisional Patent Application Ser. No. 62/700,654 filed on Jul. 19, 2018 by Joe G. Box and entitled WATERFOWL DECOY, the full disclosure of which is hereby incorporated by reference.

BACKGROUND

Waterfowl decoys are used to attract live waterfowl for observation or hunting. Many waterfowl decoys are designed to float in water, such as ponds streams and lakes, wherein overhead live waterfowl may be attracted to and land next to the floating decoy. One example of such live waterfowl that may be attracted to a waterfall decoy include, but are not limited to, puddle ducks which may be found primarily on the shallows of lakes, rivers and freshwater marshes, feeding on or near the water surface.

BRIEF DESCRIPTION OF THE DRAWINGS

FIG. 3A is a top view of portions of an example waterfowl decoy afloat in water when rocked in a first direction.

FIG. 3B is a rearview of the example waterfowl decoy of FIG. 3A.

FIG. 4A is a top view of portions of the example waterfowl decoy of FIG. 3A when not tilting to either side.

FIG. 4B is a rearview of the example waterfowl decoy of FIG. 4A.

FIG. 5A is a top view of portions of the example waterfowl decoy of FIG. 3A when being rocked to a second opposite side.

FIG. 5B is a rearview of the example waterfowl decoy of FIG. 5A.

Figure 1:
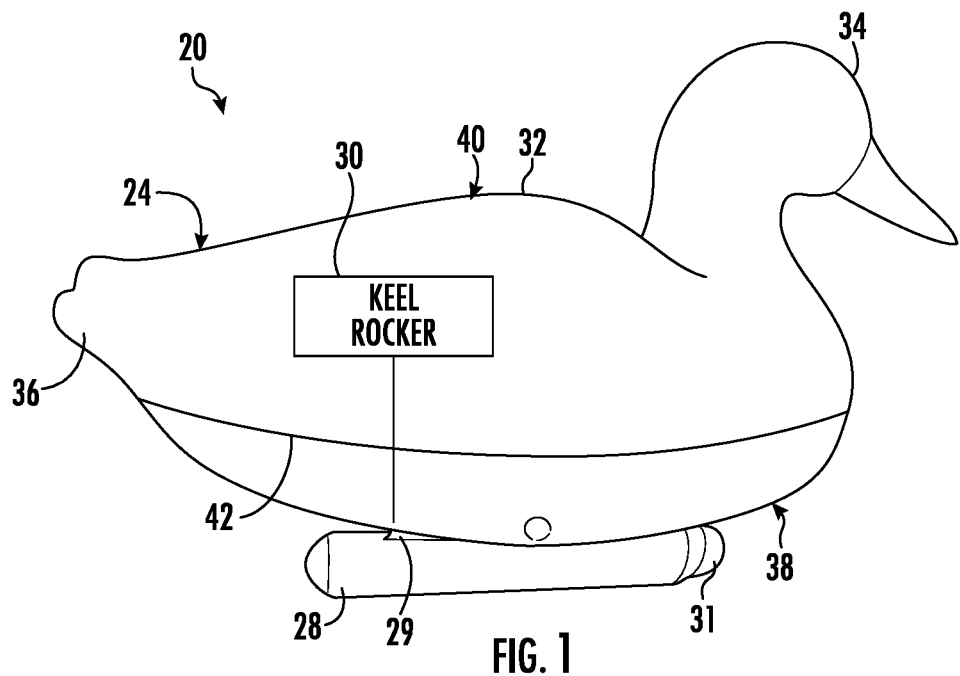
FIG. 1 is a side view of an example waterfowl decoy with portion schematically shown.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example waterfowl decoys that simulate the movement or motion of live waterfall floating on the surface of water. The example waterfowl decoys rock an underlying submersed keel to create ripples in the water about the body of the decoy. The ripples created by the rocking keel be similar to those ripples created by live waterfall. Such ripples may be easily seen by overhead live waterfall, enticing the live overhead waterfowl to land near the decoy.

In some implementations, the example waterfowl decoys may additionally include a tail portion having a rudder. In some implementations, the rudder is also rocked to create additional ripples in the water adjacent the tail portion. Such ripples may further attract or entice overhead live waterfall.

In some implementations, the keel is rocked relative to the body supporting the keel. In other implementations, the keel is fixed to the body supporting the keel, wherein the body itself is rocked. In some implementations, an actuator swings a weight within the body to rock the body. In some implementations, the actuator rotates an eccentric weight 360° about a rotational axis to create centrifugal force that rocks the body in the keel. In some implementations the actuator is also connected to the rudder of the tail portion so as to pivot the rudder and/or tail portion along with the rocking of the keel. In yet other implementations, a separate actuator may be provided to pivot the rudder and/or tail portion.

In some implementations, the waterfowl decoy additionally comprise a head portion which is pivotable relative to the main portion of the waterfowl decoy body. Some implementations, head portion is pivotable about an axis that is perpendicular to the axis about which the tail portion pivots. In some implementations, a separate actuator may be used to controllably pivot the head portion, simulating the waterfowl decoy dipping its head into or near the water surface during feeding.

In some implementations, the waterfowl decoy is powered by an internal battery. In some implementations, the waterfowl decoy is turned on and then placed in the water until removed and shut off. In some implementations, the waterfowl decoy may include a controller that outputs control signals, wherein the rocking frequency or force, the tail portion pivoting frequency or force or the head pivoting/bobbing frequency or timing may be controlled based upon user input selections. Such settings may be established prior to placement of the decoy in the water.

In yet other implementations, the waterfowl decoy may include a receiver for receiving wireless commands from a remote command source, such as a remote controller, smart phone, computer, tablet or the like, or in the wireless commands are transmitted to the controller, allowing a remote user to adjust the frequency and/or timing at which the keel is rocked, the rudder is pivoted and/or the head portion is bobbed. For example, at certain times, the keel may be rocked while the tail portion and the head portion are not pivoted. At certain times, the keel may be rocked and the tail portion may be pivoted without bobbing of the head portion. At yet other times, head portion may be bobbed without rocking of the keel or pivoting of the tail portion. At yet other times, all of such movements may be commanded or chosen by a wildlife hunter or observer or none of such movements may be commanded or chosen by the wildlife hunter or observer. Such control facilitates more realistic movement of the decoy as well as real-time adjustment based upon the proximity of live waterfall to the decoy.

In some implementations, wireless communication with the receiver may be carried out using Bluetooth technology. In some implementations, the wireless receiver may be part of a wireless transceiver, wherein the waterfowl decoy as part of a waterfowl decoy network formed by multiple similar waterfowl decoys. With such an implementation, particular waterfowl decoys may relay or forward wireless commands to other waterfowl decoys. Such an implementation facilitates communication with decoys that out of the immediate communication range of the remote controller, smart phone, laptop computer or tablet computer.

In some implementations, a single actuator is provided for rocking the keel and pivoting the tail portion/rudder. In one such implementations, the single actuator may comprise a battery powered motor having an output shaft that rotates a disc supporting an eccentrically extending pin that is received within an elongate slot of an arm pivotally connected to the body and connected to the tail portion/rudder. Rotation of the pin about the axis of the output shaft pivots the arm to pivot the tail portion/rudder. The output shaft is additionally connected to the weight that eccentrically extends from the output shaft such that rotation output shaft swings the weight to rock the keel. In one implementation, the output shaft is connected to the weight by a slip interface such that during startup of the motor, the output shaft slips relative to the weight and such that following such start up, the output shaft rotates a weight. In other implementations, the weight may be rotated or swung to rock the keel using other mechanical arrangements. For example, in some implementations, rather than being rotated 360° about the output shaft of the motor, the actuator may alternatively reciprocatively swing the weight back and forth, side to side, to rock the keel.

Disclosed is an example waterfowl decoy that may include a decoy body for flotation, a submersible keel projecting from the body and a keel rocker to rock the keel to form ripples in water about the body.

Disclosed is an example method that may include buoyantly supporting a waterfowl decoy body having a keel in water and powering an actuator to controllably rock the keel to form ripples in the water about the body.

Disclosed is an example waterfowl decoy that may include a decoy body. The decoy body may include a main portion, a tail portion pivotable about a first axis relative to the main portion and a head portion pivotable about a second axis perpendicular to the first axis relative to the main portion. The waterfowl decoy may further include a first actuator to pivot the tail portion about the first axis, a second actuator to pivot the tail portion about the second axis, a controller to output control signals to the first actuator and the second actuator and a wireless receiver to receive wireless commands and to transmit the wireless commands to the controller The controller is to output the control signals based upon the wireless commands.

FIG. 1 is a top view illustrating portions of an example waterfowl decoy 20, wherein selected portions are schematically illustrated. Waterfowl decoy 20 simulates the movement or motion of live waterfall floating on the surface of water. Decoy 20 rocks an Underlying submersed keel to create ripples in the water about the body of the decoy 20. The ripples created by the rocking keel be similar to those ripples created by live waterfall. Such ripples may be easily seen by overhead live waterfall, enticing the live overhead waterfowl to land near the decoy 20. Decoy 20 comprises decoy body 24, submersible keel 28 and keel rocker 30.

Body 24 comprises a buoyant structure in the overall shape or appearance of a waterfowl, such as a puddle duck. In the example illustrated, body 24 is three-dimensional, having a central or main portion 32, a head portion 34 and a tail portion 36. In other implementations, body 24 may be two-dimensional. In one implementation, body 24 is formed from a blow-molded polymer. In one implementation, selected portions of body 24 may be formed from other materials. For example, the chest, head and tail portion 36 may be a additionally or alternatively formed from a soft silicone material. In the example illustrated, certain portions of body 24 may be foam filled to facilitate buoyancy. The foam may additionally suppress or dampen noise produced by internal actuators of decoy 20. In the example illustrated, body 24 comprises a lower half 38 and an upper half 49 joined along a seam 42, wherein the upper half may be unfastened or disconnected from the lower half to provide access to the interior of body 24. In other implementations, doors or hatches may be provided at other portions of body 24.

In some inplementations, body 24 may comprise co-molded components and/or components that are molded together. Moreover, the body portions can be configured to attach relative to one another and/or to be glued to one another. This joining can be any means known in the art including, but not limited to, bonding, gluing, friction welding and heat bonding. However, any manufacturing methods may also be used to form the decoy.

Keel 28 comprises a longitudinal structure or panel projecting from an underside of body 24 along a longitudinal centerline of body 24, the longitudinal centerline extending from the head to the tail of the decoy. Keel 28 is located such that keel 28 is submersed below the surface of water when decoy 20 is freely floating within the water.

In one implementation, keel 28 can be a weighted keel that is known in the art. Moreover, keel 28 can be any keel known in the art and include any keel feature. Keel 28 can include a keel riser 29 that can be used to space the keel from the decoy body to optimize the location of the keel. Yet further, riser 29 can be used to space the keel from the body to reduce the visual impact of the keel thereby making the keel less visible to the waterfowl being hunted. In one implementation, keel 28 is a weighted keel to provide additional stabilizing effect on the decoy in view of the motion of the decoy. In yet other embodiments, keel 28 can be configured to be adjustable wherein the amount of weight in the keel can be changed based on environmental factors, the degree of ripples desired or the personal preferences of the hunter. Yet even further, the weighted portion of the keel can be such that it is not added to the decoy until after the decoy is purchased to reduce shipping cost. Moreover, keel 28 can include a cap 31 that can be a selectively removable cap that can allow weighted materials, such as sand, to be selectively introduced into a hollow keel structure to allow a desired amount of weight to be added to the keel. However, while it is preferred that keel 28 be weighted, this is not required. As is discussed above, the weight of the keel could also be created by including some or all of the power source for the decoy 20.

Keel rocker 30 comprise a mechanism to rock the keel 28 so as to form ripples in the water about the body 24. In one implementation, keel rocker 30 rocks the keel 28 relative to body 24. In another implementation, keel 28 is fixed to body 24, and movable relative to body 24. For example, in one implementation, keel 28 may be integrally formed as a single unitary body with a lower portion of body 24. In such an implementation, keel rocker 28 may rock body 24 itself which results in the rocking of keel 28.

Figure 2:
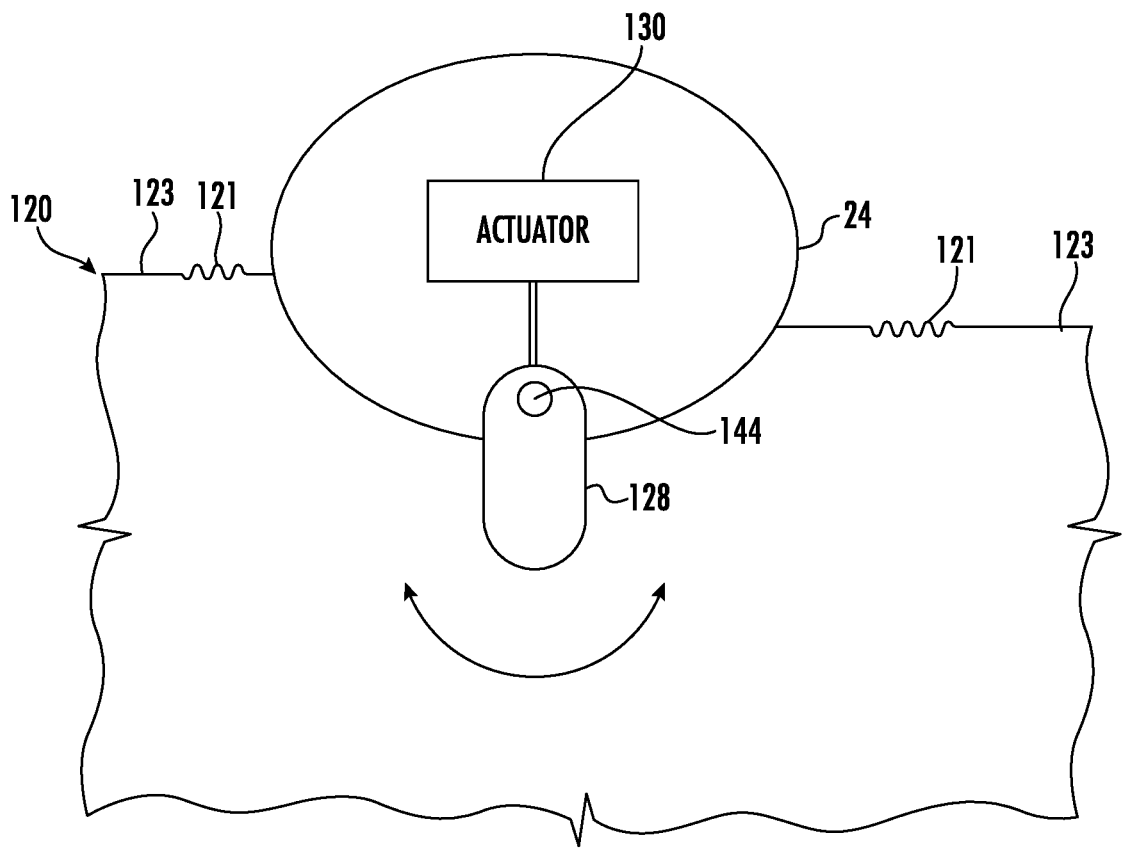
FIG. 2 is a rear view illustrating portions of an example waterfowl decoy afloat in water.

FIG. 2 schematically illustrates decoy 120, a particular example implementation of decoy 20. Decoy 120 is similar to decoy 20 described above, including body 24 as well as head portion 34 and tail portion 36 (not shown in FIG. 2), except that decoy 120 specifically comprises keel 128 which is movably coupled to body 24. In particular, as shown in FIG. 2, keel 28 is pivotally coupled to body 24 for pivotal movement about axis 144. Decoy 120 comprises a keel rocker 130 in the form of an actuator. Rocker 130 pivots or rotates keel 128 relative to body 24 about axis 144 so as to form the ripples 121 in the water 123.

In one implementation, rocker 130 may comprise an electrically powered motor that rotates a disk or plate having an eccentric pin that slides within elongate slot of an arm connected to keel 128 so as to rotate keel 28 about axis 144 (similar to transmission 538 described hereafter). In another implementation, rocker 130 may comprises other mechanisms for converting rotation provided by an electrically driven motor into reciprocating pivotal movement of keel 128. In one implementation, rocker 30 may comprise a reversible stepper motor having a first pinion gear in meshing eight with a second pinion gear connected to a shaft that is connected to keel 128. In one implementation, actuator and 30 may be powered by an onboard battery and may be under the control of a controller or integrated circuit.

FIGS. 3A, 3B, 4A, 4B, 5A and 5B schematically illustrate portions of waterfowl decoy 220, another example implementation of waterfowl decoy 20. FIGS. 3A, 4A and 5A are top views of the schematically illustrated decoy in water 123 while FIGS. 3B, 4B and 5B are rear views of the schematically illustrated waterfowl decoy in water 123 during the rocking of keel 228. As shown by FIGS. 3B, 4B and 5B, keel 228 is fixed to body 24 so as to move with body 24. In one implementation, keel 228 is integrally formed as a single unitary body with lower portions of body 24. In other implementations, keel 228 may be fastened, bonded, welded, snapped into or otherwise stationarily mounted to lower portions of body 24.

As shown by FIGS. 3A, 4A and 5A, waterfowl decoy 220 comprises a rocker 230 that is configured to rock body 24 itself so as to also rock the attached or extending keel 228. In the example illustrated, rocker 230 is configured to swing a weight so as to rock body 24 and keel 228. In the example illustrated, rocker 230 comprises weight 250 and actuator 252. Weight 250 is movably supported within body 24. Actuator 252 moves weight 250 to rock the body 24 and the keel 228. As shown by FIG. 4A, in one implementation, actuator 252 may comprise an electrically powered motor (electrically powered by an onboard battery or an electrical power cord extending to a remote power source, not shown) which rotates weight 250 about a vertical axis 254 so as to rotate and swing weight 250 in a continuous fashion 360° about axis 254 as indicated by arrow 255. Such rotation results in weight 252 being swung to opposite sides of the longitudinal axis 259 of body 24.

In another implementation, actuator 252 may comprise an electrically driven motor that is operably connected to weight 250 so as to pivot or reciprocate weight 250 back-and-forth in an arc, as indicated by arrows 257, from a first side of a longitudinal centerline 259 of body 24 to a second side of the longitudinal centerline 259 of body 24, causing body 24 and keel 228 to pivot or rock about a longitudinal axis 261 generally parallel to the length of keel 228. The precise location of the rocking axis 261 may vary.

In some implementations, rocker 230 may alternatively linearly translate or slide a weight along a guide bar shaft, back-and-forth between a first side of the longitudinal axis and a second side of the logical axis so as to rock body 24 and rock the underlying keel 228. For example, in one implementation, the weight may comprise a weight mounted on a rack gear, wherein the rack gear is literally translated by a rotatably driven pinion gear to move the weight from a first side to a second side of the longitudinal axis and vice versa. Such an implementation, the motor may be reversible to drive the rack gear in opposite directions. In other implementations, other transmissions may be used to facilitate reciprocating back-and-forth linear movement of the weight.

FIGS. 3A-5B illustrate the rocking of decoy 220. FIG. 3A illustrates decoy 220 at the moment in time when weight 250 has been swung (or otherwise moved) to the right side of axis 259 by actuator 252. As shown by FIG. 3B, this results in decoy 220 rocking in a clockwise direction about axis 261 to pivot decoy 228 to the left, creating ripples 121 in the water surface. FIG. 5A illustrates decoy 220 at the moment in time when weight 250 has been swung (or otherwise moved) to the left side of axis 259 by actuator 252. As shown by FIG. 5B, this results in decoy 220 rocking in a counter-clockwise direction about axis 261 to pivot decoy 228 to the right, creating ripples 121 in the water surface. The ripples 121 may be more easily seen from overhead live ducks, potentially attracting the live waterfowl to the decoy 220.

Figure 6:
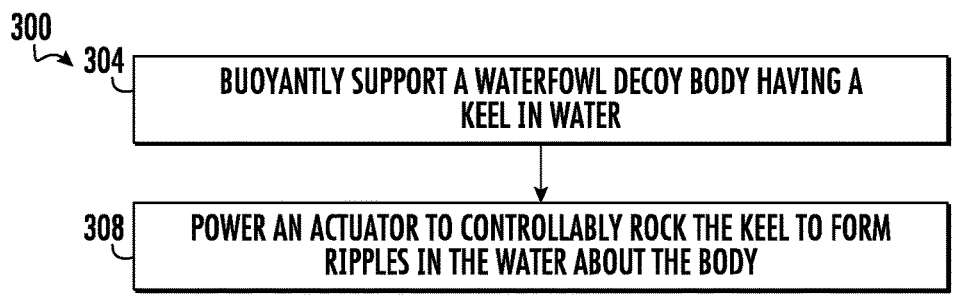
FIG. 6 is a flow diagram of an example waterfowl decoy method.

FIG. 6 is a flow diagram of an example waterfowl decoy method 300 for attracting overhead and nearby live waterfowl. As indicated by block 304, a waterfowl having a keel is buoyantly supported in water. As indicated by block 308, an actuator is powered to controllably rock the keel so as to form ripples in the water about the body.

Figure 7A:
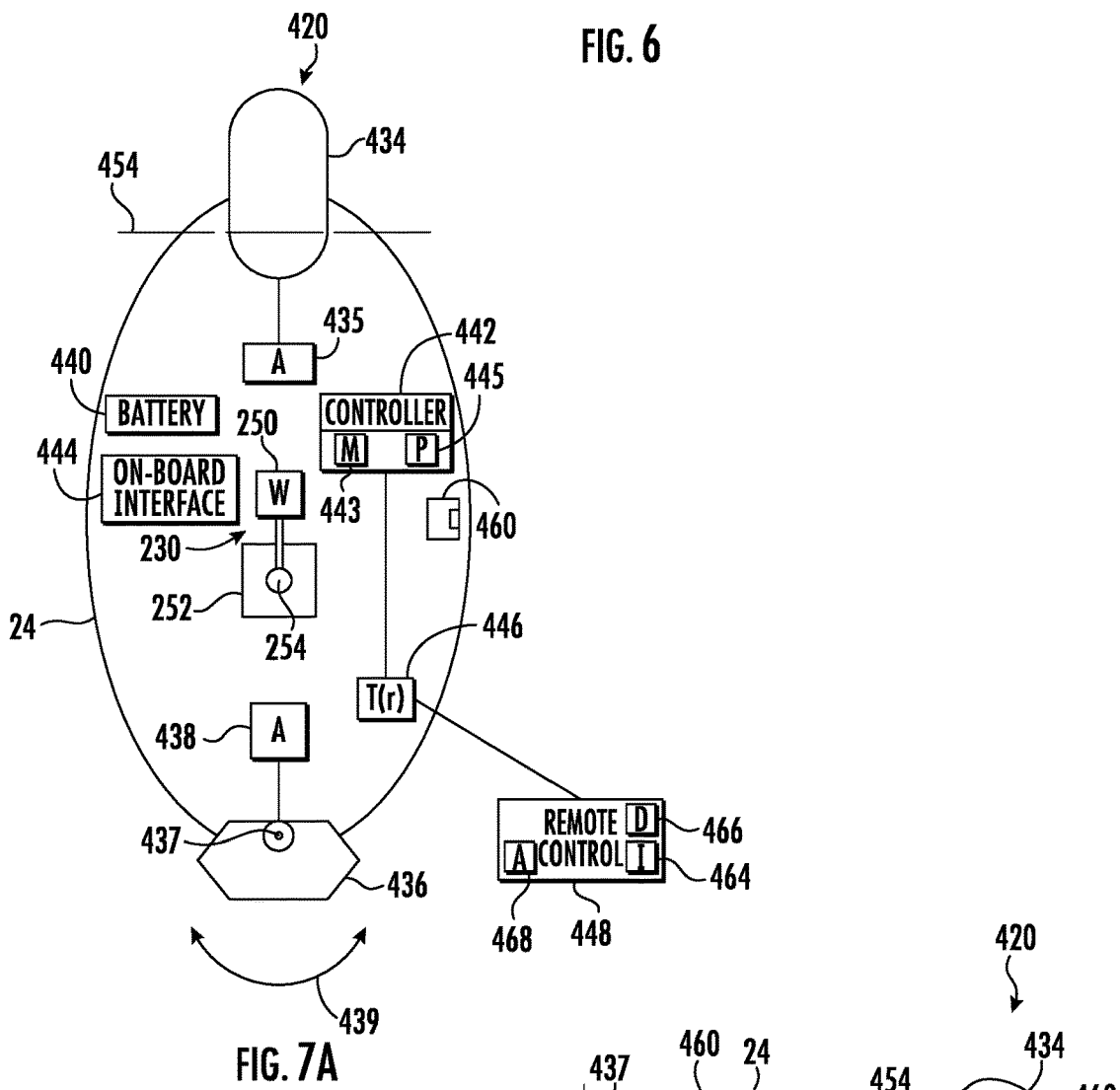
FIG. 7A is a top view of an example waterfowl decoy with portions schematically illustrated.
Figure 7B:
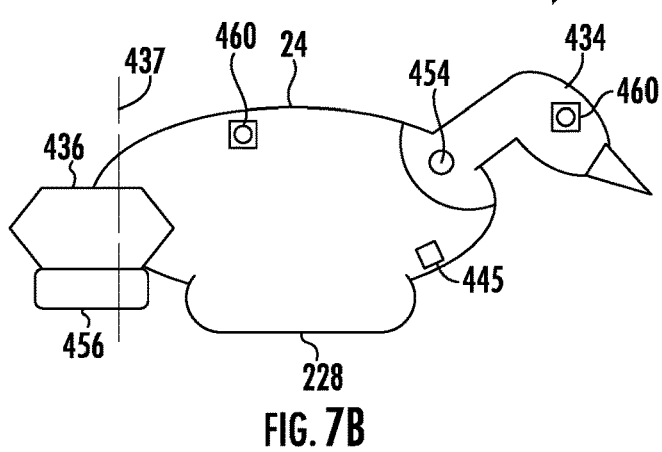
FIG. 7B is a side view of the example waterfowl decoy of FIG. 7A.

FIGS. 7A and 7B illustrate portions of an example waterfowl decoy 420. Waterfowl decoy 420 is similar to waterfowl decoy 220 described above except that decoy 420 comprises head portion 434, actuator 435, tail portion 436, actuator 438, battery 440, onboard interface 442, controller 442, onboard interface 444, transceiver 446 and remote control 448. Those remaining components of decoy 420 which correspond to components of decoy 220 are numbered similarly and/or are shown in FIGS. 3A-5B above.

Head portion 434 is similar to head portion 34 except that head portion 434 is pivotably coupled to body 24 for pivotal movement about a horizontal axis, such as axis 454. As a result, head portion 434 may pivot about axis 434 between a raised position and a lowered position, simulating the bobbing of the head of the waterfowl towards the water surface such as during feeding. In some implementations, the pivoting or bobbing of head portion 434 may assist in creating ripples that are transverse to the direction of the ripples created by the rocking of keel 28.

Actuator 435 comprises an electrically powered actuator that controllably pivots head portion 434 about axis 454. In one implementation, actuator 435 may comprise an electric motor driving a shaft about a horizontal axis, wherein the shaft rotates a vertically oriented disc have any eccentric pin that slide within an elongate slot of an arm that is connected to head portion 434. The rotation of the pin eccentric to the shaft results in the arm and the head portion 434 pivoting about axis 454. In yet other implementations, actuator 435 may comprise an electrically powered motor driving a worm gear and intermeshing with another gear that is operably coupled to head portion 434 so as to pivot head portion 434 about axis 454. In another implementation, actuator 435 may comprise a reversible stepper motor having a pinion gear connected to a pinion gear that is fixed to head portion 434, wherein controller rotation of the stepper motor in either direction pivots head portion 434 about axis 454. In yet other implementations, actuator 435 make have other configurations for controllably pivoting head portion 434 about axis 454.

Tail portion 436 is similar to tail portion 36 described above except that tail portion 436 is pivotally coupled to body 24 for pivotal movement about a vertical axis, such as axis 437. As shown by FIG. 7B, tail portion 436 comprises a submersible rudder 456 which is at least partially submersed when decoy 420 is afloat. Submersible rudder 456 further assists in creating ripples in the water surface during pivoting of tail portion 436. In some implementation, rudder 456 is integrally formed as a single unitary body with tail portion 436, appearing as part of tail portion 436. In some implementations, rudder 456 may be omitted. In some implementations, tail portion 436 may be fixedly joined to or integrally formed as part of body 24, omitting actuator 438.

Actuator 438 comprises an electric motor driving a shaft about a vertical axis, wherein the shaft rotates a horizontally oriented disc having an eccentric pin that slides within an elongate slot of an arm that is connected to tail portion 436. The rotation of the pin eccentric to the shaft results in the arm and the tail portion 436 reciprocatively pivoting about axis 437 as indicated by arrows 439. In yet other implementations, actuator 438 may comprise an electrically powered motor driving a worm gear and intermeshing with another gear that is operably coupled to tail portion 436 so as to pivot tail portion 436 about axis 437. In another implementation, actuator 438 may comprise a reversible stepper motor having a pinion gear connected to a pinion gear that is fixed to tail portion 436, wherein controller rotation of the stepper motor in either direction pivots tail portion 436 about axis 437. In yet other implementations, actuator 436 may have other configurations for controllably pivoting tail portion 436 about axis 437.

Battery 440 comprises at least one battery supported by body 24 and electrically connected to the remaining electrical power components of decoy 420 by various electrical and/or mechanical switches control by controller 442. In one implementation, battery 440 comprises a replaceable DC battery. In another implementation, battery 440 may comprise at least one rechargeable battery. In implementations where decoy 420 is powered from a remote power source connected to decoy at 420 by a submersible electric line or cord, battery 440 may be omitted.

Controller 442 controls actuator 252, actuator 435 and actuator 438. Controller 442 comprises a non-transitory computer-readable medium or memory 443 containing instructions for directing a processing unit 445 to output control signals to actuator 252, actuator 435 and actuator 438 (when provided in contrast to decoy 520 described hereafter). In one implementation, controller 442 may be embodied on an integrated circuit card or board using various switch and logic components.

Onboard interface 444 comprises external interfaces by which a user may locally and directly interface with controller 442 and battery 440. In one implementation, onboard interface 444 may comprise a port, such as a universal serial bus port, for communicating with controller 442 and/or charging battery 440. In some implementations, onboard interface 444 may comprise a charging port for battery 440. In some implementations, onboard interface 444 may comprise a pushbutton, toggle switch, slide bar, dial or the like for entering commands or input to controller 442. In some implementations, onboard interface 44 may comprise a display or a touchscreen.

Using any of such various input devices, onboard interface 444 may be turned on and off. Using any of such various input devices, any of actuators 252, 435 and 438 may be independently turned on and off. As a result, rudder 228 may be rocked while head portion 434 is bobbing and while tail portion 436 is pivoting or swiveling. Individual ones of actuators 252, 435 and/or 438 may likewise be independently turned off for a controlled combination of motions. In some implementations, any of such input devices may be further used by a user to control the frequency or rate at which such motions occur. For example, by turning a dial or sliding of a slide bar, the user may provide inputs to controller 442 to change or select the rate at which head portion 434 bobs about axis 454, the rate or force at which body 24 and keel 228 rock about axis 261 and/or the rate at which tail portion 436 swivels about axis 437.

In some implementations, the memory of controller 442 may comprise preinstalled setting combinations, routines or programs, wherein such inputs provided by onboard interface 444 facilitate a user selecting one of the preinstalled setting combinations. For example, the memory of controller 442 may store a first combination of settings for actuators 252, 435 and 438 to attract first type of waterfall and a second combination of settings to attract a second type of waterfowl. The memory of controller 442 may store a first combination of settings for use in a first set of weather conditions and a second set or combination of settings for use in second different weather conditions. For example, a user may choose between the different setting combinations depending upon the wind speed or waviness of the water. The memory of controller 442 may store a first combination of settings for use in a first depth of water and a second set or combination of settings for use in a second depth of water. The memory of controller 442 may store a first combination of settings for use during the first time of day or during a first time of the year and a second set or combination of settings for use during a second different time of day or during a second different time of the year. As a result, user may select a combination of settings for actuators 252, 435 and 438 (when provided) that customized the controlled motions to various waterfowl targets or to various conditions under which decoy 420 is currently being used. In some implementations, some or all of the components of battery 440, controller 442, on-board interface 444 and transceiver 446 may be selectively removable so that it could be utilized in multiple decoys or even to allow the device to be charged on a charging stand.

As schematically shown in FIGS. 7A and 7B, in some implementations, decoy 420 may additionally comprise various differently located cameras/sensors 460. In one implementation, camera/sensors 460 may comprise cameras for capturing images (still shot or video) of live fowl attracted by decoy 420. Such images may be stored in the memory of controller 442. In another implementation, camera/sensors 460 may additionally or alternatively comprise motion sensors that sense the presence of attracted live waterfowl. In such implementations, instructions contained in the non-transitory memory of controller 442 may cause controller 442 to automatically adjust the settings for actuators 252, 435 and/or 438 based upon the captured images or based upon motion signals received from at least one of camera/sensors 460. For example, upon sensing an attracted live waterfowl by a motion sensor/camera 460, controller 442 may slow or stop or otherwise adjust the frequency or speed of the motion of head portion 434, the rocking of keel 228 and/or the pivoting of tail portion 436 to avoid scaring the attracted live waterfowl.

In some implementations, camera/sensor 460 may additionally or alternatively sense current conditions, such as the depth of the water in which decoy 420 is floating, the current temperature, lighting conditions and/or wind conditions. In such an implementation, the camera/sensor 460 may output signals to controller 442 indicating such conditions, wherein controller 442 automatically stops or adjusts the motion provided by actuator 252, actuator 435 and/or actuator 438. In some implementations, camera/sensors 460 may be omitted.

Transceiver 446 comprises a receiver and a transmitter for communicating with remote control 448. In one implementation, transceiver 446 comprises a wireless transceiver for receiving and transmitting wireless signals, such as radiofrequency signals or Bluetooth signals. In yet other implementations, transceiver 446 is a wired transceiver, indicating with remote control 448 using a communication cable or wire that may be submersible. Transceiver 446 serves as a receiver, receiving input and commands from remote control 448 and transmit such commands or input to controller 442. In some implementations, transceiver 446 may additionally serve as a transmitter, transmitting current status, settings or images (from camera/sensors 460) to remote control 448. Transceiver 446 use a wide range of communicating technologies including, but not limited to, blue tooth technology, cellular technology, Radio Frequency technology (R/F), satellite technology and even GPS technology to determine location. Yet further, the control function of the motion device could be handled by way of a cell phone application.

Remote control 448 facilitates remote monitoring and control of decoy 420. In one implementation, remote control 448 may comprise a smart phone, a portable computing tablet, a laptop computer or a specialized control unit for communicating with decoy 420. Remote control 448 comprises at least one input 464 (schematically illustrated), such as a dial, toggle switch, touchscreen, keypad, touchpad, pushbutton or the like, that facilitates the control and adjustment of decoy 420 by user remote from the current location of decoy 420, such as when decoy 420 is deployed on the water. Remote control 448 further facilitate adjustment of the motions of decoy 420 based upon a remote user's observation from afar. For example, a user, camouflaged, may see that live waterfowl being attracted to the decoy. In response to such results, the user may input adjustment commands via the remote control 448 to adjust the operational characteristics of at least one of actuator 252, actuator 435 and/or actuator 438 (when provided). Similar to onboard interface 444, remote control 448 and transceiver 446 may be utilized by user to input various commands, settings or selections from amongst various preinstalled programs (described above with respect to onboard interface 444). In some implementations, new programs or setting combinations may be installed or stored in the memory of controller 442 using remote control 448 and transceiver 446. Alternatively, such new programs or setting combinations may be directly installed the onboard interface 444, such as through use of a universal serial bus port of interface 444.

In some implementations, the remote control 442 may further include a display screen 466 receiving and displaying images captured by camera/sensor 460 in the form of a camera. In some implementations, remote control 448 may include an alert mechanism 468 (schematically illustrated) such as a speaker, vibrator or LED, to output audible, tactile or visual alerts, respectively, to a user in response to a change in a sensed condition, such as a change in water depth, wind condition, temperature or lighting condition (notifying the user that a change in the operational settings for the actuators may be warranted) or alerting the user to a change in the sensed presence of live waterfowl proximate to decoy 420. Such alerts may notify an un-attentive user of the live water file or may identify to which decoy, of a fleet of decoys, the live water file is nearest. In some implementations, transceiver 446 and remote control 448 may be omitted.

Figure 8:
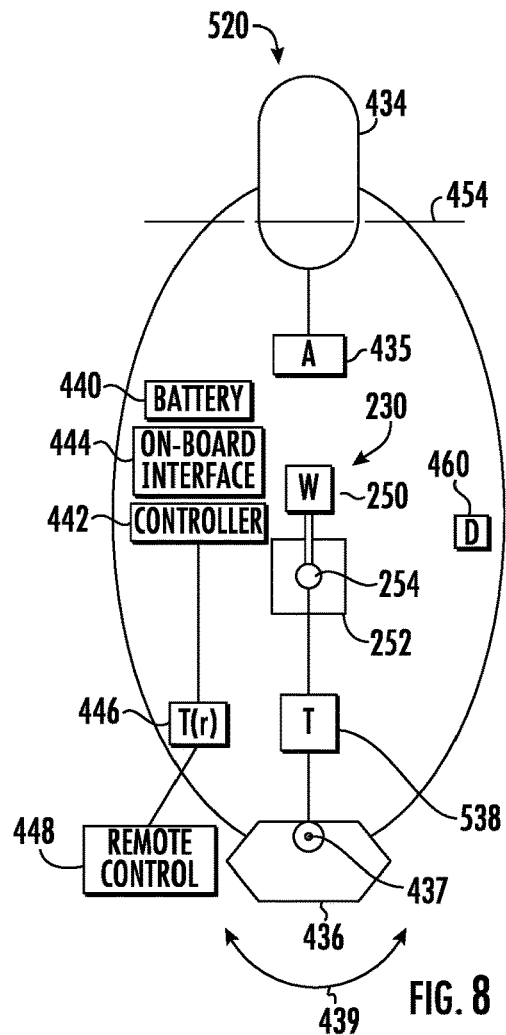
FIG. 8 is a top view of an example waterfowl decoy.

FIG. 8 is a top view schematically illustrating portions of an example waterfall decoy 520. Waterfowl decoy 520 is similar to waterfowl decoy 420 except that waterfowl decoy 520 additionally comprises a transmission 538 that operably couples actuator 252 to tail portion 436, facilitating the use of actuator 252 to drive both the rocking of keel 228 and the swiveling or pivoting of tail portion 436. Those remaining components of decoy 520 which correspond to components of decoy 420 are numbered similarly in FIG. 8 and/or are shown in FIGS. 7A and 7B.

Transmission 538 comprise a mechanical transmission coupled between actuator 252 and tail portion 436 to create reciprocating motion for tail portion 436 using the power provided by actuator 252. As a result, decoy 520 utilizes one less actuator, reducing cost, size and weight.

Figure 9:
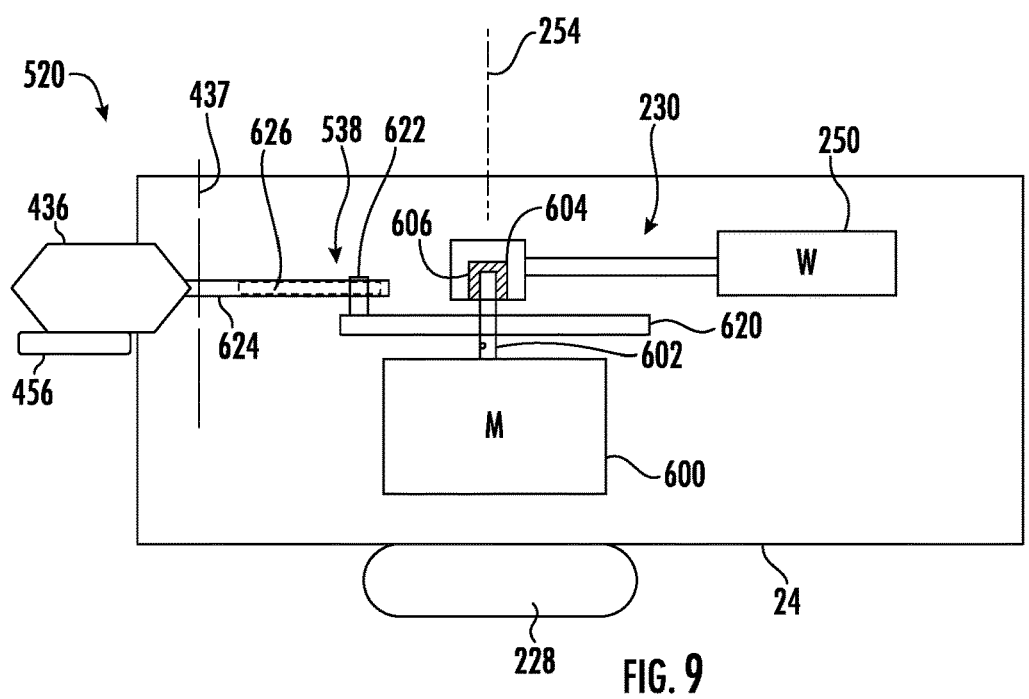
FIG. 9 is a side view schematically illustrating portions of an example keel rocker and transmission for pivoting an example tail portion of the decoy of FIG. 8.

FIG. 9 illustrates one example of rocker 230 and transmission 538 in more detail. As shown by FIG. 9, actuator 252 comprises an electrically powered motor 600 having an output shaft 602 connected to weight 250 so as to swing weight 253 360° about axis 254 as described above to cause rocking of body 24 (schematically shown) and keel 228. In the example illustrated, output shaft 602 is connected to weight 250 by slip interface 604 extending between output shaft 602 and an interior bore 606 extending from the arm of weight 250. Slip interface 604 may comprise a rubber coating formed on the interior surface of bore 606 or formed on the exterior surface of shaft 602. Slip interface 604 has a coefficient of friction with respect to the unattached portion of shaft 602 or bore 606 such that shaft 602 slips relative to weight 250 at the start up of motor 600 and subsequently grips the weight or connects the weight 250 and shaft 602 for concurrent rotation following start up to rotate weight 250. Slip interface 604 minimizes or prevents damage to motor 600 during startup.

Transmission 538 transmits a rotational motion of motor 602 swiveling or pivoting motion of tail portion 436 and its rudder 456. Transmission 538 comprises a plate or disc 620, eccentric pin 622 and arm 624 having an elongate slot 626 (shown in broken lines). Disc 620 comprises a circular or non-circular structure which is fixed to output shaft 602 so as to be rotatably driven about axis 254 by motor 600. Eccentric pin 622 projects from disc 620 at a location eccentric to rotational axis 254. Eccentric pin 622 projects into slot 626 of arm 624. In one implementation, slot 626 extends completely through arm 624, wherein pin 62 also extends completely through slot 626. In another implementation, slot 626 comprises a groove or channel which receives a portion of pin 622. Arm 624 is connected to tail portion 436 which is pivotally connected to body 24 for pivotal movement about axis 437. During rotation of output shaft 602 of motor 600, pin 622 is rotated to slide pin 622 within and along slot 626, causing arm 624 and tail portion 626 to pivot about axis 437. Although described as being utilized to convert rotational motion of motor 600 into reciprocating pivoting motion of tail portion 436, transmission 538 may replicated in other portions of decoy 520 to swing weight 250 and to pivot or bob head portion 434. Transmission 538 may also be replicated in any of the above or below described decoys.

Figure 10:
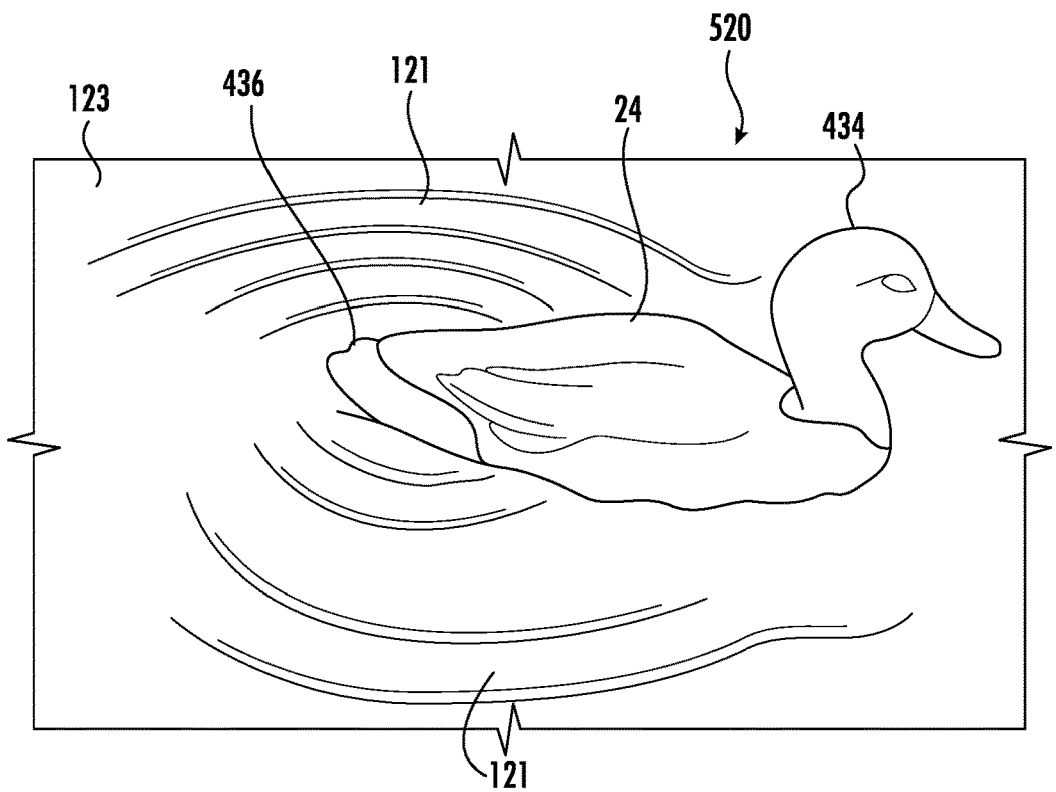
FIG. 10 is a top perspective view illustrating the decoy of FIG. 9 in a keel rocking and tail pivoting state in water to create ripples.
Figure 11A:
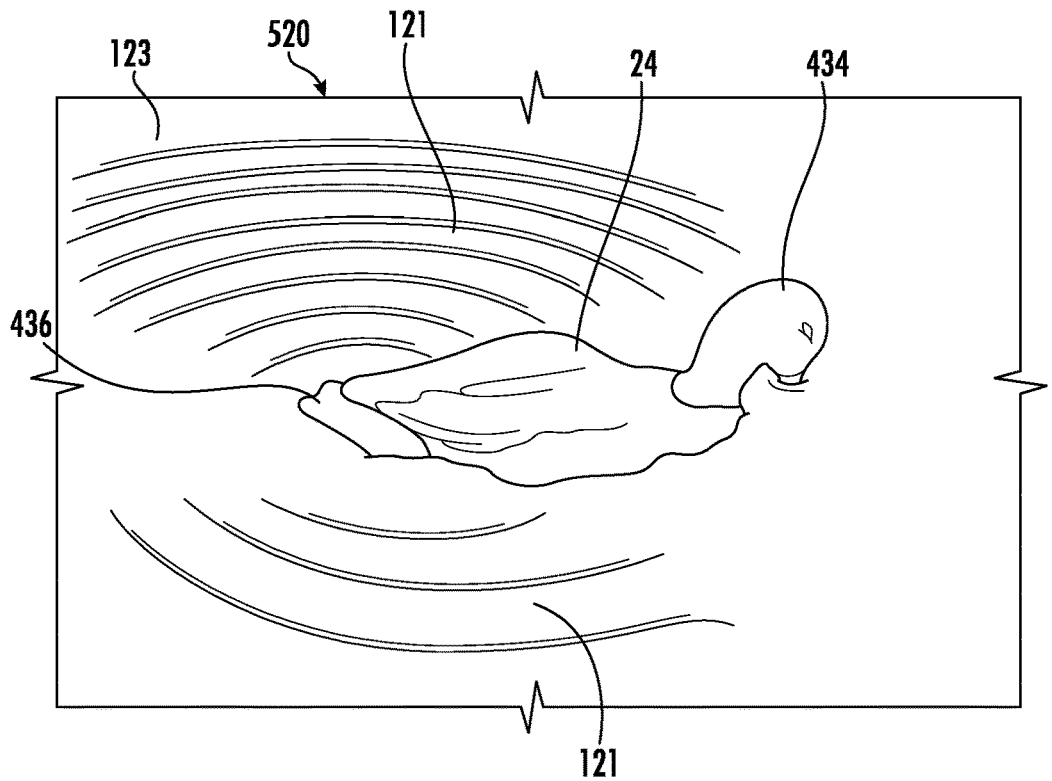
FIG. 11A is a top perspective view of the decoy of FIG. 9 in a keel rocking and tail pivoting state and in a head bobbing state.
Figure 11B:
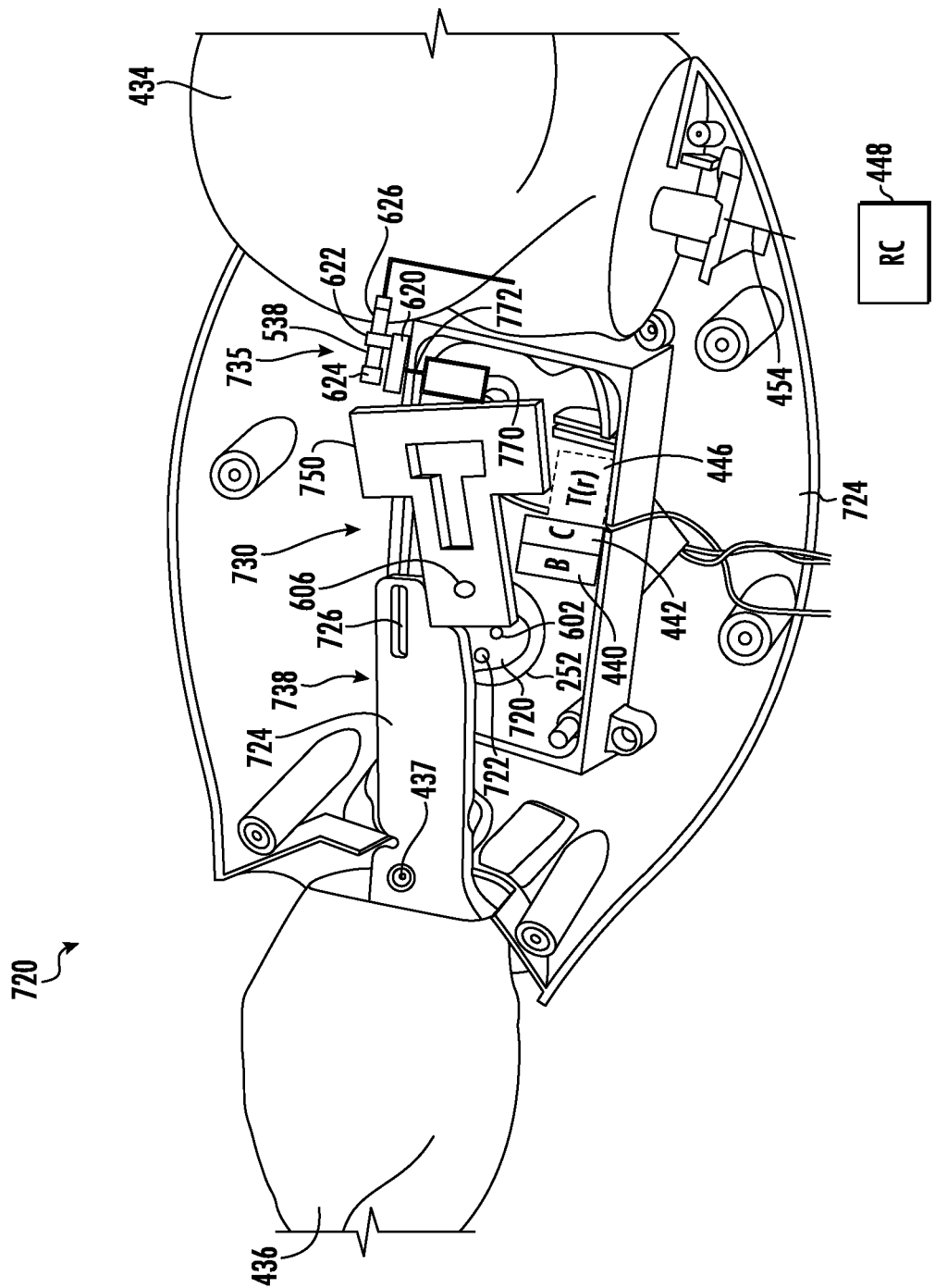
FIG. 11B is a top perspective view illustrating portions of an example waterfowl decoy in a partially disassembled state for purposes of illustration.

FIGS. 10 and 11 illustrate various states of decoy 520. FIG. 10 illustrates the rocking of body 24 and keel 228 (shown in FIGS. 7B and 9) and the swiveling or pivoting of tail portion 436 by actuator 252 while head portion 434 is in a raised state. As shown by FIG. 10, such rocking and pivoting creates ripples 121 adjacent to and about body 24 in water 123. FIG. 11 illustrates the additional pivoting of head portion 434 about axis 454 (shown in FIG. 7B) to simulate bobbing of head portion 434. As described above, each of such motions may be independently controlled and operated at independently selected frequencies and/or rates. For example, controller 442 may include an internal clock or timer, wherein the bobbing head portion 434, the rocking of keel 228 and the swiveling of tail 436 may occur at different controlled times and/or at different controlled rates. In one implementation, head portion 434 may be bobbed or pivoted for a selected period of time at selected frequency or rate, once every X minutes. Likewise, tail portion 436 may be swiveled for a selected continuous period of time (e.g. 2 minutes) at selected frequency or rate (e.g. 60 reciprocations per minute), once every X minutes (e.g. once every 10 minutes). As discussed above, such combinations may vary based upon sensed environmental conditions, the sensed presence of other live waterfowl and/or user inputted choices.

As described above, the motion(s) can be random motion, continuous motion, set interval motions, variable motions and even remotely controlled motions as desired by the end user. The motion of decoy 420 can be selectively activatable and even remotely controllable by remote control 448. This can include, but is not limited to, including an operating system or control instructions in memory 443 that automatically turns the motion device on and off at selectable intervals and a water switch 445 that detects when the decoy is placed in water. Such motion control may also include, but is not limited to, starting movement routines stored in the computing device. According to one set of embodiments, remote control device can simply turn the decoy on and off. And, when the decoy is on, motions can be on a "random" timer. Moreover, the remote can turn the decoy on and the computing device and/control device can run the decoy through preselected motions. Examples of preset motions are as follows Example 1

1—a head feeding motion (head bobbing about axis 454) that lasts between 4 and 10 seconds, and
2—a tail flutter (tail pivoting about axis 437) and/or keel rocking that happens after the sequence of head feeding motion
3—repeat Example 2

1—6 seconds of head feeding (head bobbing)
2—1.5 seconds of tail flutter and/or keel rocking
3—10 seconds of idle
4 4-8 seconds of head feeding (head bobbing)
5—10 seconds of idle
6 6-12 seconds of head feeding (head bobbing)
7 7-1.5 seconds of tail flutter 8 8-10 seconds of idle
9 9—repeat Again, these are examples only wherein any steps could be programmed into the decoy and/or the decoy could be configured to allow the end user to program custom steps.

In some implementations, controller 442 may include operation steps or buttons that can create random motions or motions that follow a predetermined routine that is either set by the end user or the manufacturer of the decoy product. The computing device of controller 442 could be programed and/or programmable such that an endless amount of motion intervals, motion durations and/or motion levels can be achieved. As can be appreciated, a single constant motion would be less lifelike than random motions of varying degree. Therefore, both the motions intervals, the duration of the motion and the speed of the motion could be variable as desired and/or stored as operation steps in the computing device. This can include different settings based on the environment, the particular species of waterfowl, and/or merely the preferences of the end user.

FIG. 11 is a top perspective view illustrating portions of an example decoy 720 with portions partially disassembled for purposes of illustration. Decoy 720 is similar to decoy 520 described above. As shown by FIG. 11, decoy 720 comprises body 724 (a lower portion of which is illustrated) head portion 434, tail portion 436, keel 228 (shown and described above) extending from underside of body 724, keel rocker 730, transmission 738, actuator 735 incorporating transmission 538, battery 440, controller 442, transceiver 446 and remote control 448. Head portion 434 is pivotally coupled to body 724 about pivot axis 454 while tail portion 436 is pivotally coupled to body 724 for pivotal movement about axis 437. Tail portion 436 includes an underlying rudder 456 (shown and described above)

Keel rocker 730 is similar to keel rocker 230. Keel rocker 730 comprises an actuator 252 in the form of an electrically powered motor, the actuator/motor 252 having an output shaft 602 for being received within bore 606 of weight 750. In the example illustrated, bore 606 is lined with interface coating 604 (described above). In other implementations, interface coating 604 may be coated upon the end of shaft 602. When assembled, of shaft 602 swings weight 750 360° about output shaft 602 to rock body 724 and the underlying keel 228.

Transmission 738 is similar transmission 538 described above. Transmission 738 comprises disk 720 supporting eccentric pin 722. Disk 720 is fixed to shaft 602 so as to rotate with shaft 602. Eccentric pin 722 projects into and is slidably received within an elongate slot 726 of an elongate arm 724 that is connected to tail portion 436. Rotation of disk 720 by motor 252 slides pin 722 within the slot 726, pivoting and swinging arm 724 and tail portion 436 in a reciprocating manner (back-and-forth manner) about axis 437.

Actuator 735 is used to controllably pivot or bob head portion 434 about axis 454. Actuator 735 comprises an electrically powered motor 770 having an output shaft 77262 disk 620. Disk 620 supports and eccentrically located pin 622 slides within an elongate slot 626 of the elongate arm 624 which is fixed to head portion 434. As shown in FIG. 11, transmission 538 is generally oriented 90° with respect to the transmission 538 shown in FIG. 9 or transmission 738 shown in FIG. 11. During rotation of output shaft 772, pin 622 slides within slot 626 to rotate arm 624 and head portion 434 about axis 454. In other implementations, motor 770 may be connected to head portion 434 by other transmission arrangements so as to bob head 434 in a reciprocating manner about axis 454.

Figure 12:
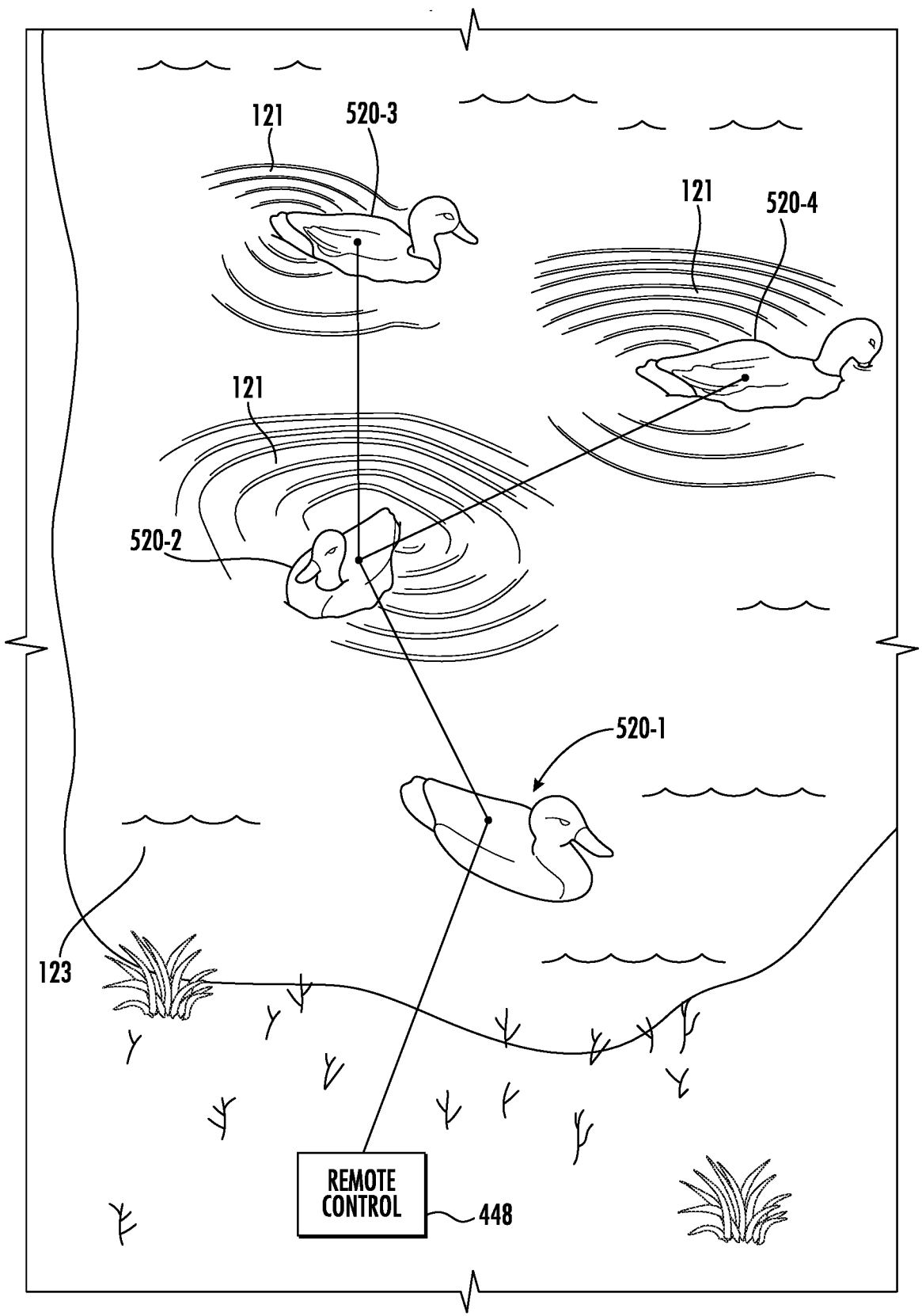
FIG. 12 is a top perspective view illustrating communication between a remote control and a fleet or set of waterfowl decoys forming an example communication network.

FIG. 12 is a top perspective view illustrating a set of inter-communicating waterfowl decoys 520-1, 520-2 520-3 and 520-4 (collectively referred to as decoys 520) deployed and afloat on a body of water 123. Although the set is comprised of decoys 520, in other implementations, the set may comprise other water file decoys having wireless transceivers, such as any of decoys 20, 220 or 720 so equipped. Decoys 520 and remote controller 448 facilitate communication with remote decoys 520 that may or may not be within the immediate range of remote control 448. For example, in one implementation, remote control 448 may communicate using Bluetooth having a predetermined transmission or communication range. Decoys 520 remote control 448 expand or enlarge the overall communication range of remote control 448, allowing decoys 522 be located farther away from rural control 448 (which may be in a camouflaged or hidden location) while using less expensive shorter range communication technologies.

In the example illustrated, the controller 442 (shown in FIG. 8) of each of decoys 520 contains instructions for directing the processing unit to identify the identity or address of the signal received and, if the address is for a different one of decoys 520, relaying or forward the communication to the other decoy 520 having the particular identity or address contained in the communication. In some implementations, the single communication may be providing input or commands for a setting for at least one of actuator 252, 435 and 4384 each of multiple decoys 520 constituting the entire fleet of decoys 520 that are deployed or a selected portion of the total number of deployed to decoys. In such an implementation, the communication from remote control 448 may include the address for each of multiple decoys 520. In such an implementation, the first receiving decoy 520 may then forward the communication to each of the decoys identified in the communication. If the first decoy receiving the communication is also identified in the communication, the first receiving decoy may carry out the instructions or setting adjustments contained in the communication while also forwarding the same communication to the other identified or address decoys.

Likewise, communication from the remote decoys, such decoy 520-3, back to remote control 448 may also be facilitated by the relaying or forwarding of communications by intermediate decoys 52o decoys 520 more closely located to remote control 448. For example, remote control 448 may, in response receiving input from a user at remote control 448, output control signals which are wirelessly transmitted to the closest decoy 520-1 which is in communication range with remote control 448. Transceiver 446 of decoy 520-1 relays the communication to its associated controller 442. The associated controller 442 may then analyze the addresses assigned to the communication, such as an initial communication packet or header of the communication. Based upon such analysis, the associated controller 442 of decoy 520-1 may carry out the instruction contained in the communication (if the communication is addressed to decoy 520-1) and further forward the communication to the other addressed decoys, such as decoy 520-2. Decoy 520-2 may be outside of the initial local range of remote control 448, but is able to receive communications from remote control 448 using the intermediate communication provided by decoy 520-1. In the example illustrated, decoys 520-3 and 520-4 are also beyond the communication range of remote control 448. In some implementations, decoys 520-3 and 520-4 may also be outside or beyond the communication range of the transceiver 446 of decoy 520-1, utilizing the intermediate decoy 520-24 communication in the thus formed communication network.

Decoy 520-2 may carry out the same protocol is carried out by decoy 520-1. In particular, the transceiver 446 of decoy 520-2 may forward the received communication to its controller 442, wherein is controller 442 analyzes the addresses of the other decoys identified in the packet. Decoy 520-2 may further identify the decoy 520-1 from which the communication was received such that the communication packet will not be unnecessarily retransmitted back to the source decoy 520-1. In one example scenario, the communication packet may include additional addresses for decoys 520-3 and decoys 520-4. In such a situation, controller 442 of decoy 520-2 may then forward the communication, using its associated transceiver 446, to both of decoys 520-3 and 520-4.

In the example illustrated, each of controllers 442 may contain instructions in his memory 443 for directing processing unit 445 to carry out the following network linking algorithm. Pursuant to the linking algorithm, controller 442, upon receiving a remote communication, first reads or analyzes the header or additional packet containing addresses or identities of the intended targets for the communication. If the address or groups of addresses includes an address for the current decoy, the controller carries out the instructions, such as adjusting the operational settings for actuators 252, 435 and/or 438 (where actuator 438 is utilized for tail portion 436 instead of actuator 252). If the address or groups of addresses includes other addresses, the controller forwards the communication to such other decoys using its transceiver 446. The other decoys, receiving the communication, follow the same algorithm.

In some implementations, each decoy is configured to receive communication signals at a particular frequency, different from the receiving frequency of the other decoys. In such an implementation, remote controller 448 transmits the communication to the local decoy 520-1 that is within its communication range at the particular frequency of the local decoy 520-1. Decoy 520-1, upon determining that decoy 520-2 is one of the targeted or addressed decoys, communicates with decoy 520-2 using the particular frequency associated with decoy 520-2. Decoy 502-2 communicates with decoys 520-3 and 520-4 using their different assigned communication frequencies.

In some implementations, the remote control 448 may be configured to control some or all of the decoys 520 either individually or as a group. In some implementations, one or more of the decoys 520 may be configured to communicate with other decoys in the group such that the decoys of the group move together and/or create complimentary movements. Moreover, the group of decoys 520 may be controlled by way of a master decoy, such as decoy 520-1, wherein the other decoys ("slaves") 520-2, 520-3, 520-4 may be operated by way of the master decoy. In this arrangement, different communication technology could be used for the communication between the master and slave decoys. For example, only, RF technology could be used between the remote device and the master decoy and Bluetooth® could be utilized between master and slave decoys. As should be appreciated, a wide range of group variation could be achieved with a group of decoys. In some implementations, the decoys 520 of the group could be the same and/or have different configuration and/or motions.

The above described process of linking or daisy chaining communications between different decoys of the fleet may continue, facilitating a wide dispersion or deployment of decoys 520 while using a shorter range communication technology for remote control 448. As discussed above, communications back to remote control 448 from remote decoys 520 may follow a reverse pattern. The short range communication network, such as a Bluetooth network, facilitated by decoys 520 and remote control 448 provide lower cost communication across a wider distance.

Although the present disclosure has been described with reference to example implementations, workers skilled in the art will recognize that changes may be made in form and detail without departing from disclosure. For example, the decoys of this disclosure may include any other features known in the art including, but not limited to, other motion devices (such as head, neck, tail, feathers), anatomically correct outer shells, adjustable and/or replaceable keels, scent, sound and even propulsion systems. Moreover, the disclosed decoys may be of any waterfowl known in the art. Although different example implementations may have been described as including features providing various benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A waterfowl decoy comprising:
   a decoy body for flotation;
   a submersible keel projecting from the body;
   a keel rocker to rock the keel to form ripples in water about the body.

2. The waterfowl decoy of claim 1, wherein the keel is movably coupled to the body and wherein the keel rocker rocks the keel relative to the body.

3. The waterfowl decoy of claim 1, wherein the keel is fixed to the body and wherein the keel rocker comprises:
   a weight movably supported within the body; and
   an actuator to move the weight to rock the body and the keel.

4. The waterfowl decoy of claim 3, wherein the actuator is configured to swing the weight from a first side of the body to a second side of the body to rock the body.

5. The waterfowl decoy of claim 4, the weight eccentrically extends from a rotational axis of the actuator and wherein the actuator rotates the weight 360 degrees about the rotational axis.

6. The waterfowl decoy of claim 5, wherein the body comprises a tail having a submersible rudder.

7. The waterfowl decoy of claim 5, wherein the body comprises a main portion supporting the keel and a tail portion having a submersible rudder pivotable relative to the main portion.

8. The waterfowl decoy of claim 7, wherein the actuator pivots the submersible rudder to form second ripples adjacent the tail portion.

9. The waterfowl decoy of claim 8, wherein the actuator comprises:
   a motor having an output shaft connected to the weight to rotate the weight;
   a disc connected to the output shaft so as to be rotated by the output shaft, the disc having a pin spaced from the output shaft;
   a pivot arm pivotally connected to the main portion of the body, the pivot arm having a first portion coupled to the submersible rudder and a second portion having a slot receiving the pin.

10. The waterfall decoy of claim 9, wherein the output shaft is connected to the weight by a slip interface such that the shaft slips relative to the weight at motor start up and subsequently grips the weight following startup to rotate the weight.

11. The waterfowl decoy of claim 9, wherein the body further comprises a head portion pivotable relative to the main portion, wherein the head portion is pivotable about a first axis and wherein the submersible rudder is pivotable about a second axis perpendicular to the first axis.

12. The waterfowl decoy of claim 11 further comprising a second actuator to pivot the head portion relative to the main portion.

13. The waterfowl decoy of claim 12 further comprising a controller to output control signals controlling the rocking of the keel, the pivoting of the rudder and the pivoting of the head portion.

14. The waterfowl decoy of claim 13 further comprising a wireless receiver to receive wireless commands and to transmit the wireless commands to the controller.

15. The waterfowl decoy of claim 14, wherein the receiver is part of a wireless transceiver and wherein the controller is configured to relay the wireless commands to a second receiver of a second decoy using the wireless transceiver.

16. The waterfowl decoy of claim 7 further comprising a second actuator to pivot the rudder.

17. The waterfall decoy of claim 3 further comprising:
   a controller to output control signals controlling the rocking of the keel; and
   a wireless receiver to receive wireless commands and to transmit the wireless commands to the controller.

18. A method comprising:
   buoyantly supporting a waterfowl decoy body having a keel in water;
   powering an actuator to controllably rock the keel to form ripples in the water about the body.

19. The method of claim 18 further comprising swinging a weight within the waterfowl decoy body with the actuator to rock the keel.

* * * * *